US009223179B2

(12) United States Patent
Hosokawa et al.

(10) Patent No.: US 9,223,179 B2
(45) Date of Patent: Dec. 29, 2015

(54) LIQUID CRYSTAL DISPLAY APPARATUS

(75) Inventors: Daichi Hosokawa, Ishikawa-gun (JP);
Sakae Yoshida, Ishikawa-gun (JP)

(73) Assignee: Japan Display Inc., Tokyo (JP)

( * ) Notice: Subject to any disclaimer, the term of this patent is extended or adjusted under 35 U.S.C. 154(b) by 883 days.

(21) Appl. No.: 13/305,141

(22) Filed: Nov. 28, 2011

(65) Prior Publication Data

US 2012/0133879 A1 May 31, 2012

(30) Foreign Application Priority Data

Nov. 30, 2010 (JP) ................................. 2010-267493

(51) Int. Cl.
*G02F 1/1343* (2006.01)
*G02F 1/1362* (2006.01)
*G02F 1/1333* (2006.01)

(52) U.S. Cl.
CPC .... *G02F 1/134309* (2013.01); *G02F 1/136209* (2013.01); *G02F 1/136213* (2013.01); *G02F 2001/133388* (2013.01)

(58) Field of Classification Search
CPC ................. G02F 1/134309; G02F 1/136209; G02F 1/136213; G02F 2001/13388
USPC ........................................... 349/47, 110–111
See application file for complete search history.

(56) References Cited

U.S. PATENT DOCUMENTS

| 5,182,620 | A | * | 1/1993 | Shimada et al. | 257/72 |
| 6,760,081 | B2 | * | 7/2004 | Takagi | 349/38 |
| 2002/0071072 | A1 | * | 6/2002 | Ohtani et al. | 349/110 |
| 2007/0291212 | A1 | * | 12/2007 | Asada et al. | 349/139 |

FOREIGN PATENT DOCUMENTS

| JP | 2003-177427 A | 6/2003 |
| JP | 2007-47615 A | 2/2007 |
| JP | 2007-334222 | 12/2007 |
| JP | 2008-151945 A | 7/2008 |

OTHER PUBLICATIONS

Office Action issued on Feb. 5, 2013, in Japanese patent Application No. 2010-267493 with English translation.

* cited by examiner

*Primary Examiner* — Charles Chang
(74) *Attorney, Agent, or Firm* — Oblon, McClelland, Maier & Neustadt, L.L.P.

(57) ABSTRACT

According to one embodiment, an apparatus includes an active area including a matrix of pixels, and a light-shielding area surrounding the active area. The apparatus includes a first substrate including a pixel electrode formed for each pixel, a switch including a semiconductor layer to switch write of a video signal to the pixel electrode, and a auxiliary capacitance line opposing the semiconductor layer to form an auxiliary capacitance, a second substrate including a counter-electrode extending from the active area to the light-shielding area, and a liquid crystal layer held between the first and the second substrate, Each of the pixel electrodes of end portion pixels formed in two end portions of the active area extends from the active area to the light-shielding area such that the pixel electrode becomes larger than others, and the auxiliary capacitance formed in the end portion pixel is greater than that formed in others.

8 Claims, 5 Drawing Sheets

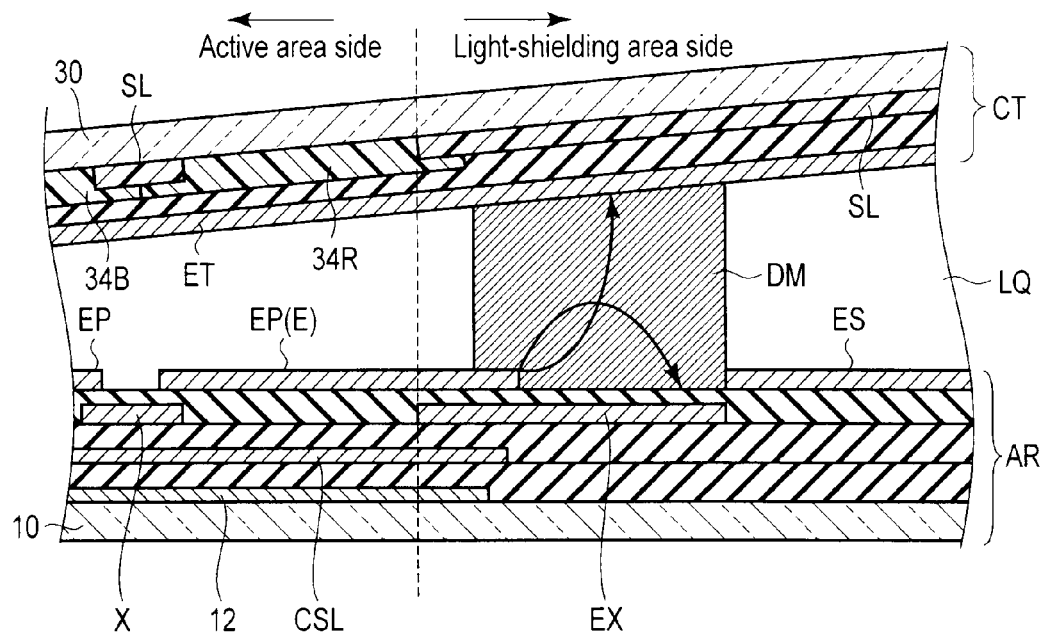
F I G. 5
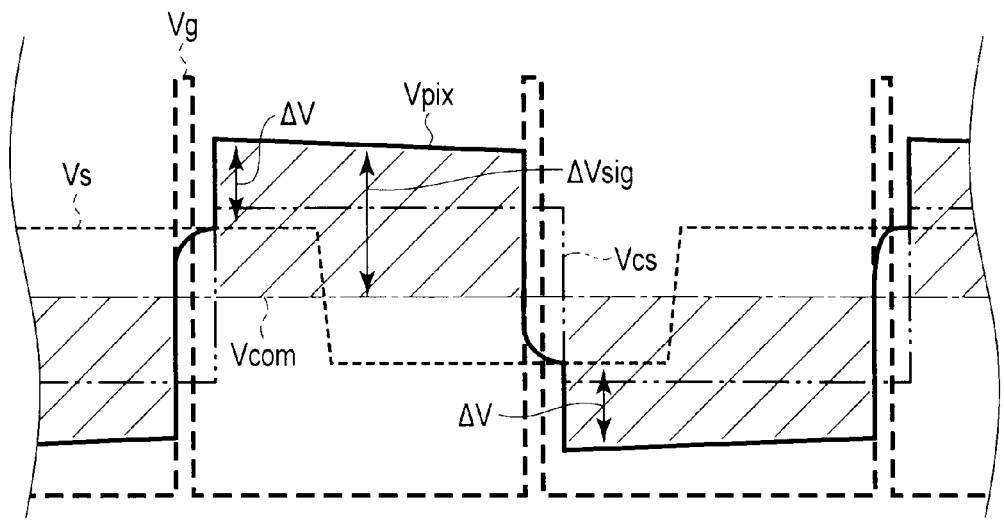
F I G. 6

US 9,223,179 B2

LIQUID CRYSTAL DISPLAY APPARATUS

CROSS-REFERENCE TO RELATED APPLICATIONS

This application is based upon and claims the benefit of priority from prior Japanese Patent Application No. 2010-267493, filed Nov. 30, 2010, the entire contents of which are incorporated herein by reference.

FIELD

Embodiments described herein relate generally to a liquid crystal display apparatus.

BACKGROUND

A liquid crystal display apparatus having a transmitting display function includes a transmitting liquid crystal display panel and a backlight unit for illuminating the liquid crystal display panel from the backside. The liquid crystal display panel has a structure in which a liquid crystal layer is held between a pair of substrates, and has an active area for displaying an image, and a light-shielding area surrounding the active area.

Each pixel forming the active area includes a pixel electrode. A counter-electrode opposing the pixel electrode extends not only to the active area but also to the outside of the active area (i.e., to the light-shielding area), by taking account of bonding misalignment of the substrates.

When a voltage is applied to the liquid crystal layer in the liquid crystal display apparatus having the structure as described above, a longitudinal electric field is formed between the pixel electrode and counter-electrode of each pixel almost along the normal direction of the liquid crystal display panel. In this state, each pixel formed in the end portion of the active area is affected by an oblique electric field formed in addition to the longitudinal electric field. That is, an oblique electric field inclined to the normal of the liquid crystal display panel is formed between the counter-electrode extending to the light-shielding area and the pixel electrode formed in the active area end portion.

Also, when a light-shielding conductor is formed to oppose a light-shielding layer in the light-shielding area, an oblique electric field inclined to the normal of the liquid crystal display panel is formed between the light-shielding conductor and the pixel electrode formed in the active area end portion.

In the pixel in the active area end portion, the interaction between the oblique electric field as described above and the longitudinal electric field may form a defective alignment region of liquid crystal molecules contained in the liquid crystal layer. When this defective alignment region is formed in the transmitting liquid crystal display panel, light from the backlight passes through the liquid crystal layer regardless of the voltage applied to the liquid crystal layer, i.e., so-called light penetration occurs, and this deteriorates the display quality.

BRIEF DESCRIPTION OF THE DRAWINGS

FIG. 5 is a view showing an example of the section when the active area of the liquid crystal display apparatus shown in FIG. 4 is pressed;

FIG. 6 is a view for explaining an example of a driving method of the liquid crystal display apparatus shown in FIG. 1;

DETAILED DESCRIPTION

In general, according to one embodiment, an active matrix type liquid crystal display apparatus having an active area including a matrix of pixels, and a light shielding area surrounding the active area, includes a first substrate including a pixel electrode formed for each pixel, a switch including a portion of a semiconductor layer and configured to switch write of a video signal to the pixel electrode, and an auxiliary capacitance line opposing the semiconductor layer to form an auxiliary capacitance; a second substrate including a counter-electrode extending from the active area to at least a portion of the light shielding area; and a liquid crystal layer held between the first substrate and the second substrate. Each of the pixel electrodes of end portion pixels formed in two end portions of the active area extends from the active area to the light shielding area such that the pixel electrode becomes larger than other pixel electrodes, and the auxiliary capacitance formed in the end portion pixel is greater than that formed in other pixels.

A liquid crystal display apparatus according to an embodiment will be explained below with reference to the accompanying drawings.

Figure 1:
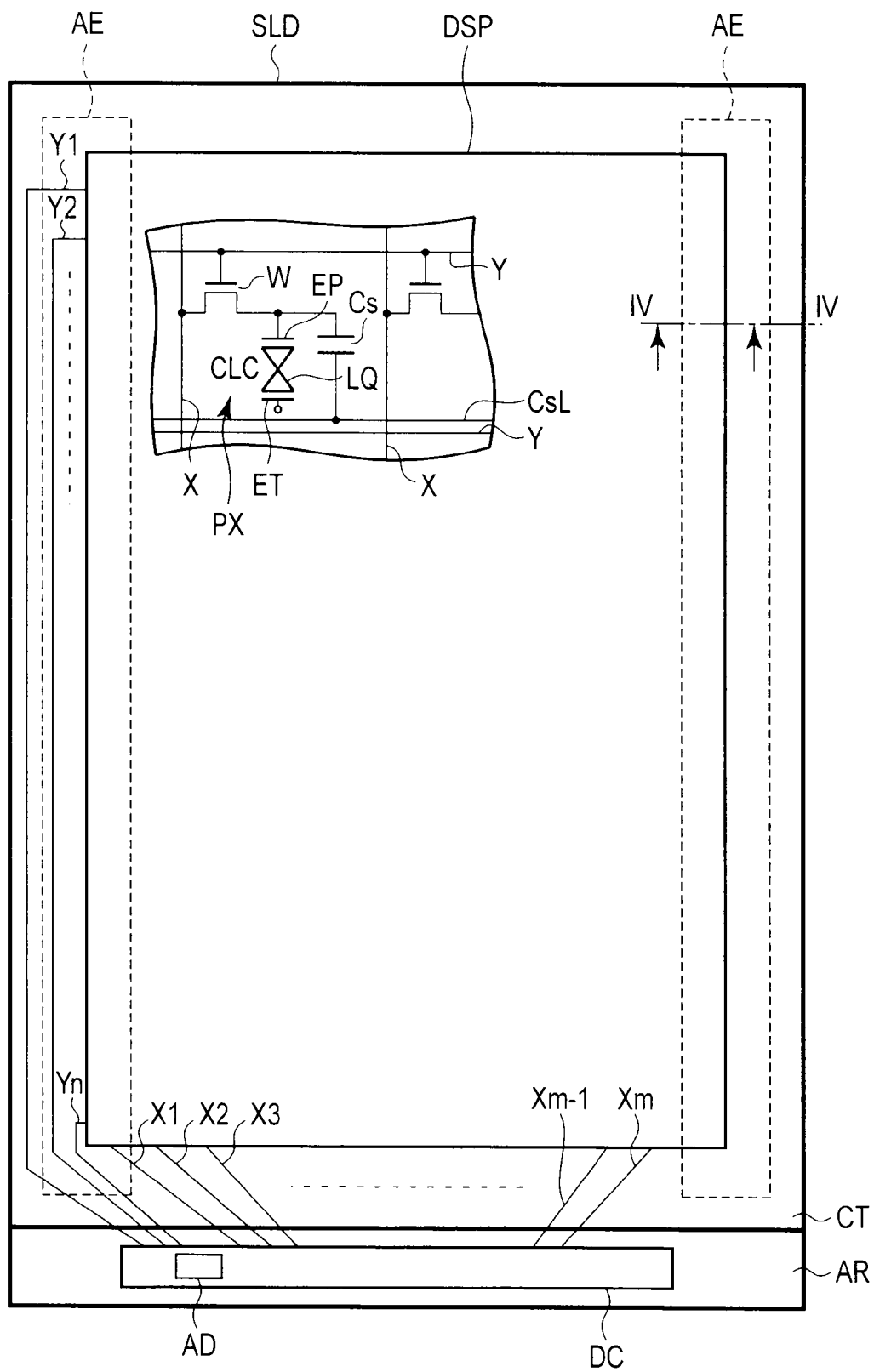
FIG. 1 is a view for explaining a configuration example of a liquid crystal display apparatus of an embodiment.
Figure 2:
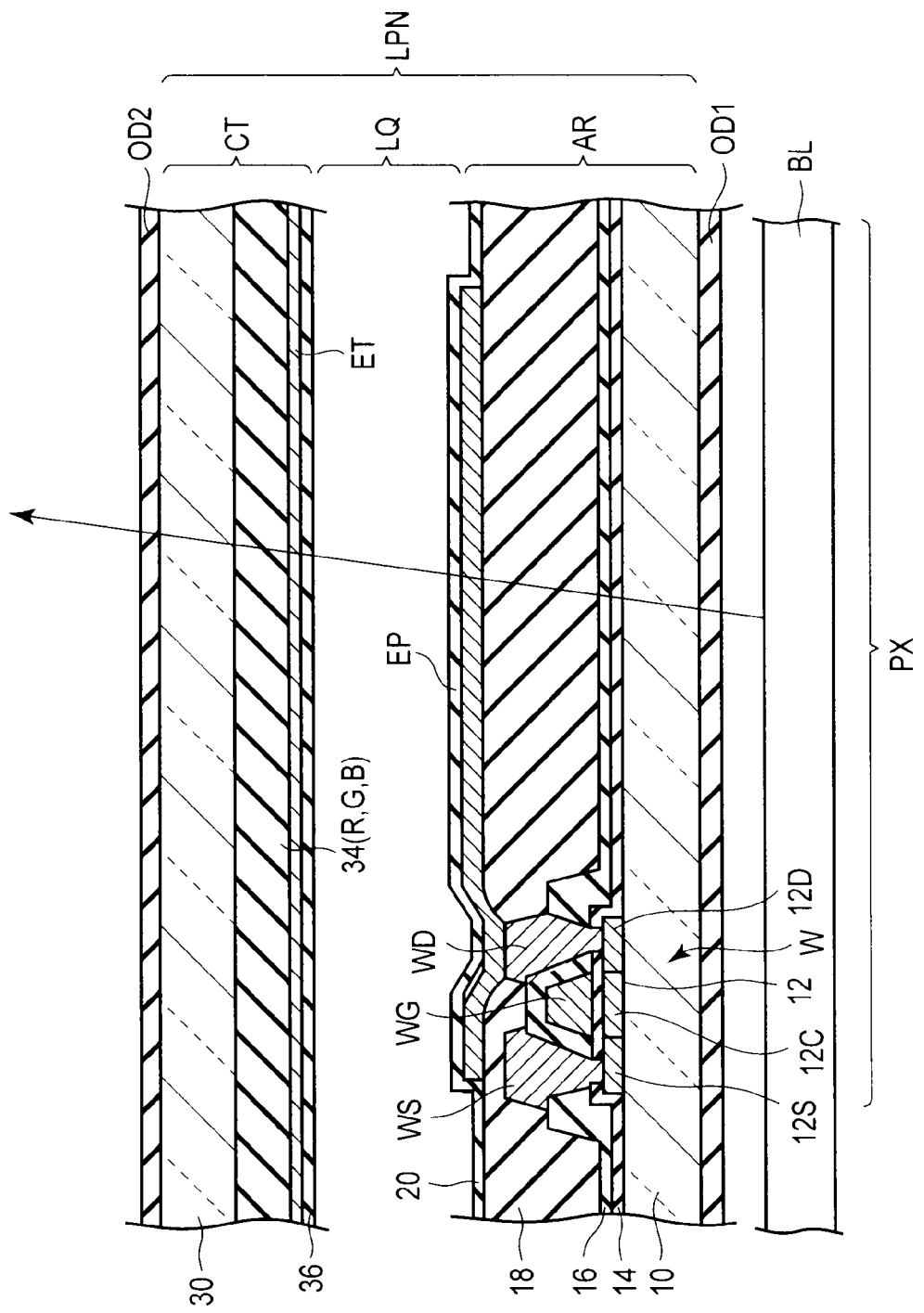
FIG. 2 is a view showing an example of the section of an active area of the liquid crystal display apparatus shown in FIG. 1.

As shown in FIGS. 1 and 2, a color display type liquid crystal display apparatus is an active matrix type liquid crystal display apparatus, and includes a transmitting liquid crystal display panel LPN. The liquid crystal display panel LPN includes an array substrate (first substrate) AR, a counter-substrate (second substrate) CT opposing the array substrate AR, and a liquid crystal layer LQ held between the array substrate AR and counter-substrate CT.

This liquid crystal display apparatus also includes a first optical element OD1 formed on the outer surface of the array substrate AR, which is opposite to the surface holding the liquid crystal layer LQ, and a second optical element OD2 formed on the outer surface of the counter-substrate CT, which is opposite to the surface holding the liquid crystal layer LQ. In addition, the liquid crystal display apparatus includes a backlight unit BL for illuminating the liquid crystal display panel LPN from the side of the first optical element OD1.

The liquid crystal display panel LPN includes an active area DSP for displaying an image, and a light-shielding area SLD surrounding the active area DSP. The active area DSP includes m×n pixels PX arranged in a matrix.

The array substrate AR is formed by using a light-transmitting insulating substrate 10 such as a glass plate. That is, in the active area DSP, the array substrate AR includes m×n pixel electrodes EP each formed for each pixel, n scanning lines Y (Y1 to Yn) and n auxiliary capacitance lines CsL (1 to n) formed along rows of the pixel electrodes EP, m signal lines X (X1 to Xm) formed along columns of the pixel electrodes EP, and m×n switching elements W each formed for the pixel PX near the intersection of a corresponding scanning line Y and corresponding signal line X. The array substrate AR includes a driver circuit DC in an area surrounding the active area DSP. In this embodiment, the driver circuit includes the auxiliary capacitance line driver AD. The driver circuit DC may include at least one of a scanning line driver and a signal line driver in addition to the auxiliary capacitance line driver AD. The auxiliary capacitance line driver AD may be mounted on an external circuit board.

The n scanning lines Y are connected to the driver circuit DC on the array substrate AR, or the scanning line driver mounted on an external circuit board. The n auxiliary capacitance lines CsL are connected to the driver circuit DC on the array substrate AR, or the auxiliary capacitance line driver AD mounted on an external circuit board. The m signal lines X are connected to the driver circuit DC on the array substrate AR, or the signal line driver mounted on an external circuit board.

FIG. 6 is a view for explaining a driving method of the liquid crystal display apparatus according to this embodiment.

The scanning line driver sequentially supplies a scanning signal (driving signal) Vg to the n scanning lines Y. The signal line driver supplies a video signal (driving signal) Vs to the m signal lines X whenever the switching elements W in each row are turned on by the scanning signal. After the scanning signal is supplied to the scanning line Y, the auxiliary capacitance line driver AD applies an auxiliary capacitance voltage Vcs having the same polarity as that of the video signal Vs to a corresponding auxiliary capacitance line CsL. The auxiliary capacitance voltage Vcs changes to the same polarity as that of the video signal during a period in which the switching element W is turned off. Consequently, a superposition voltage $\Delta V$ is superposed on a pixel potential Vpix of the pixel electrodes EP in each row. The scanning line driver, auxiliary capacitance line driver AD, and signal line driver as described above are equivalent to a voltage application mechanism for applying a voltage to the pixel electrodes EP.

In the array substrate AR, each switching element W is, e.g., an N-channel thin film transistor, and formed by a polysilicon semiconductor layer 12 above the insulating substrate 10. Although the semiconductor layer 12 is made of polysilicon in this embodiment, the switching element W may also be formed by amorphous silicon. The polysilicon semiconductor layer 12 includes a source region 12S and drain region 12D on the two sides of a channel region 12C. The polysilicon semiconductor layer 12 is covered with a gate insulating film 14. Also, as will be described later, the semiconductor layer 12 extends from the switching element W to the formation position of the auxiliary capacitance line CsL, and forms an auxiliary capacitance Cs opposing the auxiliary capacitance line CsL via an interlayer dielectric layer.

A gate electrode WG of the switching element W is connected to (or integrated with) the scanning line Y. The gate electrode WG and scanning line Y are arranged on the gate insulating film 14. The gate electrode WG and scanning line Y are covered with an interlayer dielectric film 16.

A source electrode WS and drain electrode WD of the switching element W are arranged on the two sides of the gate electrode WG on the interlayer dielectric film 16. The source electrode WS is connected to (or integrated with) the signal line X, and in contact with the source region 12S of the polysilicon semiconductor layer 12. The drain electrode WD is connected to the pixel electrode EP, and in contact with the drain region 12D of the polysilicon semiconductor layer 12. The source electrode WS, drain electrode WD, and signal line X are covered with an organic insulating film 18.

The pixel electrode EP is formed on the interlayer dielectric film 16, and electrically connected to the drain electrode WD. The pixel electrode EP is formed by a light-transmitting conductive member such as indium tin oxide (ITO). The pixel electrodes EP corresponding to all the pixels PX are covered with an alignment film 20.

On the other hand, the counter-substrate CT is formed by using a light-transmitting insulating substrate 30 such as a glass plate. That is, in the active area DSP, the counter-substrate CT includes color filter layers 34 corresponding to the pixels. The color filter layers 34 are formed by colored resins having different colors, and include a red color filter 34R arranged on red pixels, a green color filter 34G arranged on green pixels, and a blue color filter 34B arranged on blue pixels in the active area DSP.

In the active area DSP, the counter-substrate CT also includes a counter-electrode ET formed to cover the color filter layers 34. The counter-electrode ET is formed to oppose the pixel electrodes EP of a plurality of pixels PX. The counter-electrode ET is formed by a light-transmitting conductive member such as indium tin oxide (ITO). Also, the counter-electrode ET is covered with an alignment film 36. A counter-electrode driving circuit (not shown) applies a counter-voltage Vcom to the counter electrode ET.

When the counter-substrate CT and array substrate AR as described above are set such that the alignment films 20 and 36 oppose each other, a predetermined gap is formed by spacers (not shown) arranged between the two substrates. The liquid crystal layer LQ is made of a liquid crystal composition containing liquid crystal molecules and sealed in the gap formed between the alignment film 20 of the array substrate AR and the alignment film 36 of the counter-substrate CT.

The pair of alignment films 20 and 36 are rubbed. When no voltage is applied to the liquid crystal layer LQ, the liquid crystal molecules are aligned in accordance with the rubbing directions of these alignment films. In this embodiment, the rubbing directions of the pair of alignment films 20 and 36 are almost perpendicular to each other, and liquid crystal molecules in the mid plane of the liquid crystal layer LQ are aligned almost perpendicularly to the signal lines X. Note that the liquid crystal molecule alignment direction is not limited to this example, and need only fall within the range of 30° to 90°.

The first optical element OD1 and The second optical element OD2 control the polarization state of light passing through them. That is, the first optical element OD1 includes a polarizing plate having a transmission axis in a predetermined direction in the principal plane, and an absorbing axis in a direction perpendicular to the transmission axis. The second optical element OD2 includes a polarizing plate having a transmission axis in a predetermined direction in the principal plane, and an absorbing axis in a direction perpendicular to the transmission axis. These polarizing plates are arranged such that, for example, their transmission axes are almost perpendicular to each other.

Figure 7:
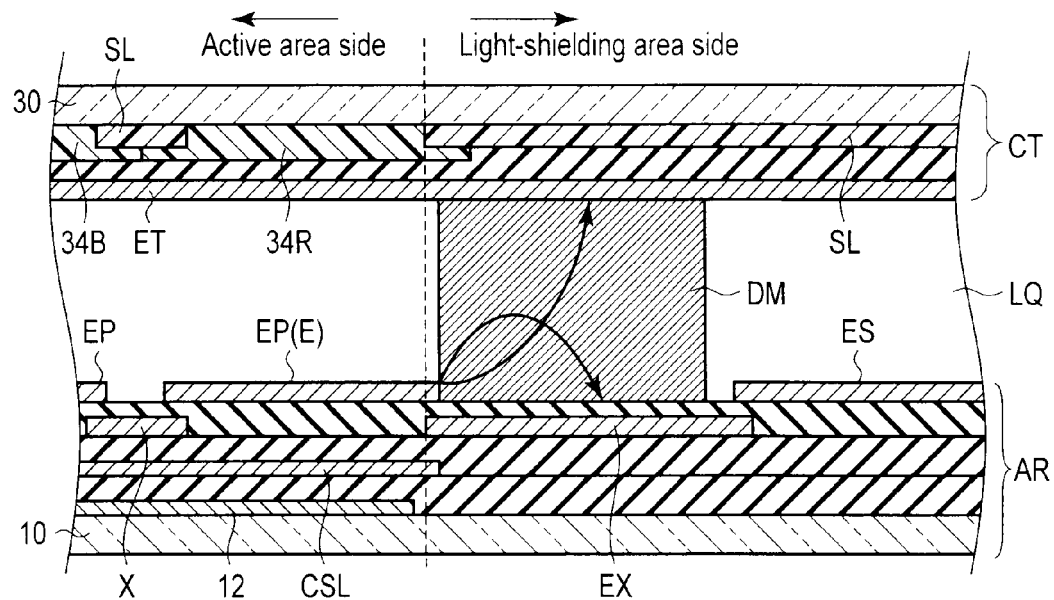
FIG. 7 is a view showing an example of the section in the end portion of the active area of the liquid crystal display apparatus.
Figure 8:
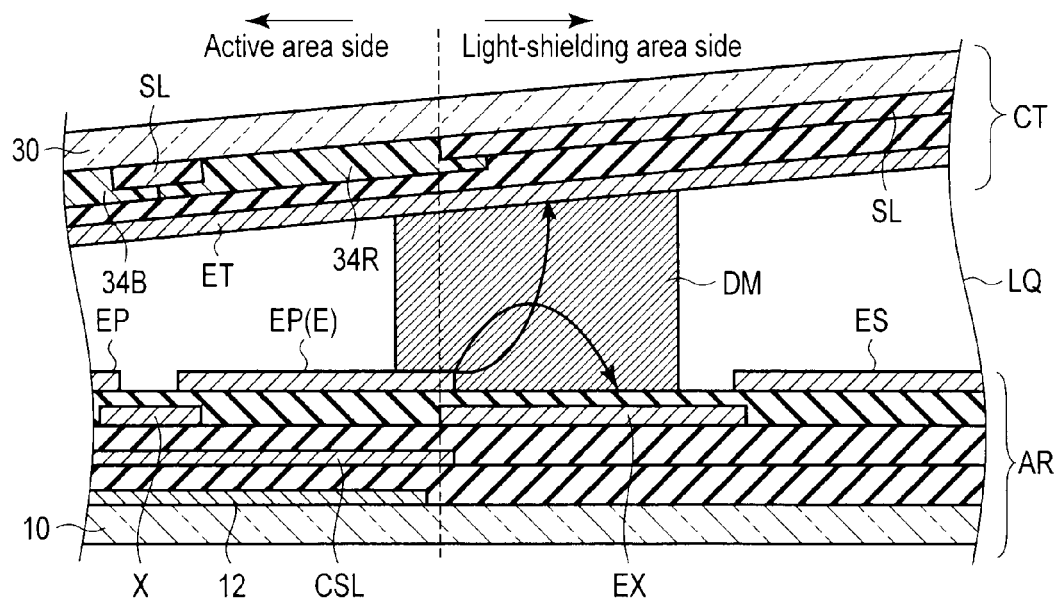
FIG. 8 is a view showing an example of the section when the active area of the liquid crystal display apparatus shown in FIG. 7 is pressed.

As shown in FIGS. 7 and 8, the color filters 34 (R, G, and B) arranged for the pixels PX having different colors are spaced apart from each other because, for example, if the color filters 34 overlap each other, an uneven gap is formed in the liquid crystal layer LQ. Therefore, a light-shielding layer (black matrix) SL is formed between the pixels PX in the active area DSP, as in the light-shielding area SLD.

The array substrate AR includes light-shielding conductive layers EX and shield electrodes ES arranged in the light-shielding area SLD. The light-shielding conductive layers EX shield light entering the liquid crystal layer LQ from the array substrate AR in the light-shielding area SLD. The shield electrodes ES suppress the influence, on the liquid crystal layer LQ, of a voltage applied to a conductive layer formed in the lower portion of the array substrate AR in the light-shielding area SLD.

The counter-electrode ET extends from the active area DSP to at least a portion of the light-shielding area SLD, by taking account of misalignment when the array substrate AR and counter-substrate CT are bonded.

In the liquid crystal display apparatus having the arrangement as described above, as shown in FIGS. 7 and 8, each pixel (end portion pixel) PX(E) formed in the end portion of the active area DSP is affected by an oblique electric field formed in addition to a longitudinal electric field formed along the normal direction of the liquid crystal display panel LPN.

As described above, an oblique electric field inclined to the normal of the liquid crystal display panel LPN is formed between the counter-electrode ET extending to the light-shielding area SLD, and the pixel electrode EP(E) of the pixel PX(E) formed in the end portion of the active area DSP. The interaction between this oblique electric field and the longitudinal electric field forms a defective alignment region DM (reverse tilt domain) of liquid crystal molecules contained in the liquid crystal layer LQ, in the pixel PX(E) in the active area end portion.

Also, in the light-shielding area SLD, the light-shielding conductive layers EX are formed on the array substrate AR so as to oppose the light-shielding layers SL on the counter-substrate CT. As shown in FIGS. 7 and 8, an oblique electric field inclined to the normal of the liquid crystal display panel LPN is formed between the pixel electrode EP(E) and the light-shielding conductive layer EX formed in the light-shielding area SLD. The interaction between this oblique electric field and the longitudinal electric field forms a defective alignment region DM of liquid crystal molecules contained in the liquid crystal layer LQ, in the pixel PX(E) in the active area end portion. Especially when the active area DSP is pressed in the thickness direction as shown in FIG. 8, the reverse tilt domain moves into the active area, and this makes an alignment defect easier to see.

Figure 3:
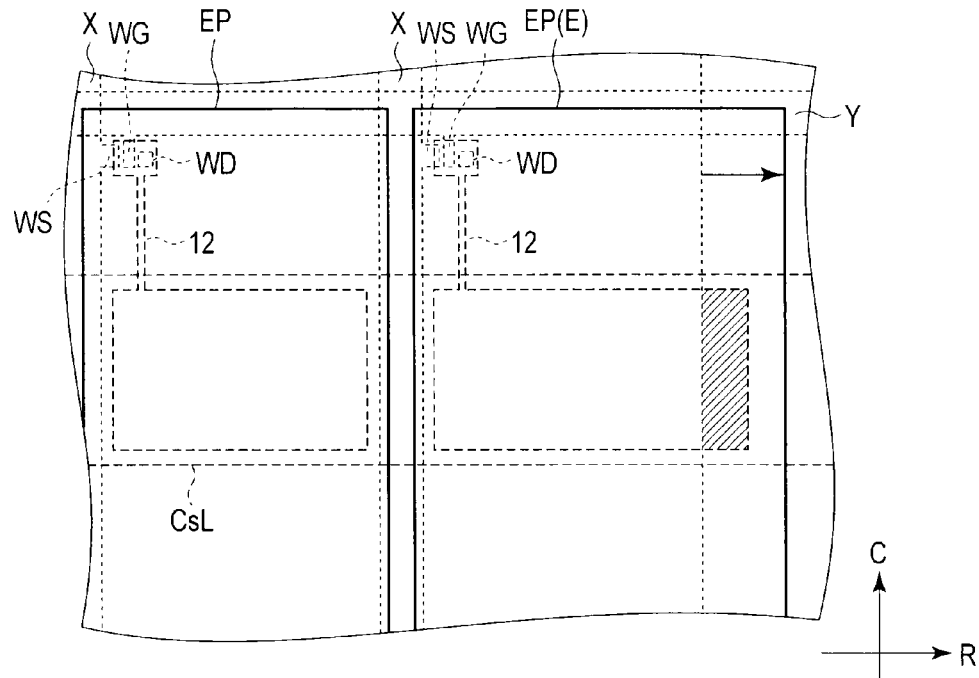
FIG. 3 is a view for explaining a configuration example of a pixel formed in the active area end portion of the liquid crystal display apparatus shown in FIG. 1.

In this embodiment as shown in FIG. 3, therefore, the pixel electrode EP(E) of the pixel PX(E) formed in the end portion of the active area DSP extends along the direction (a column direction R) in which the scanning line Y runs. The pixel electrode EP(E) differs in size, particularly, width along the column direction R, from the pixel electrodes EP formed for other pixels PX; the width of the pixel electrode EP(E) is made larger than that of the pixel in the column direction R. In this embodiment, the width in the column direction R of the pixel electrode EP(E) is made larger by about 10 μm than that of other pixel electrodes EP. The extension of the pixel electrode EP(E) in the column direction R extends toward the light-shielding area SLD and is formed outside the pixel PX(E).

Note that for pixels in the pixel column formed in the other end portion of the active area DSP, the pixel electrode EP(E) extends in the column direction R and is made larger than other pixel electrodes EP, and the extension in the column direction R extends toward the light-shielding area SLD and is formed outside the pixel PX(E).

Figure 4:
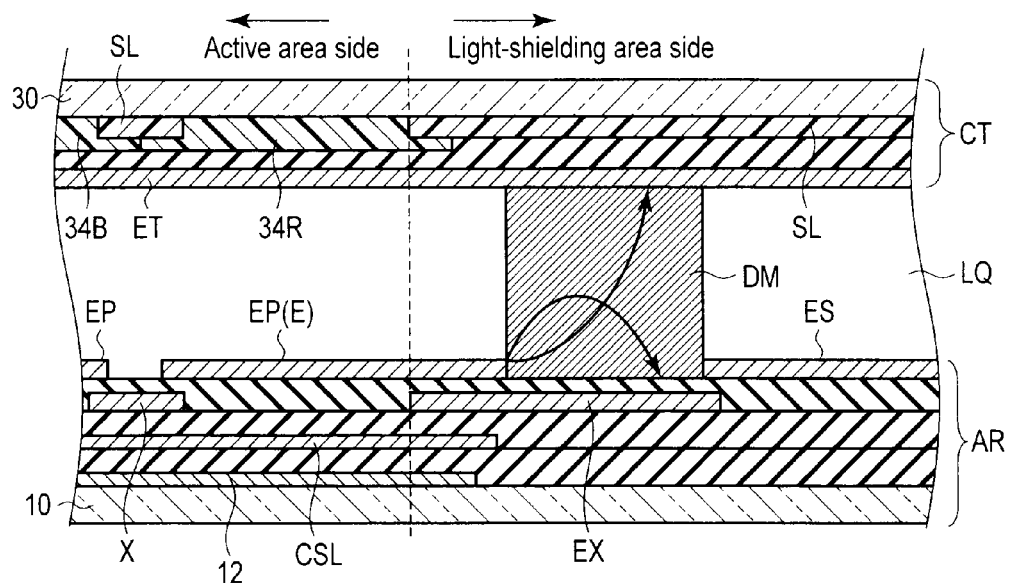
FIG. 4 is a view showing an example of the section taken along a line IV-IV of the liquid crystal display apparatus shown in FIG. 1.

In this arrangement as shown in FIGS. 4 and 5, the extension of the pixel electrode EP(E) in the column direction R extends toward the light-shielding area SLD, so the position of the end portion of the pixel electrode EP(E) opposing the light-shielding layer SL and the position of the end portion of the light-shielding layer SL are separated in the column direction R by the extension of the pixel electrode EP. Accordingly, if an oblique electric field forms the defective alignment region DM in the light-shielding area SLD, the influence stays in the light-shielding area SLD even when the active area DSP is pressed in the thickness direction as shown in FIG. 5, so the influence on the active area DSP can be reduced. This makes it possible to prevent light penetration in the active area end portion, and obtain high display quality.

In the above described embodiment, as the width in the column direction R of the pixel electrode EP(E) formed for the pixel PX(E) is increased (as the position of the end portion of the pixel electrode EP(E) and the position of the end portion of the light-shielding layer SL are separated in the column direction R), the effect of reducing the influence of the oblique electric field increases. However, the difference in coupling capacitance (Cps) between the pixel electrode EP and signal line X increases between the pixel PX(E) and other pixels PX, and the pixel potential Vpix of the pixel PX(E) becomes lower than that of other pixels.

A change (superposition voltage) $\Delta V$ in pixel potential Vpix of the pixel PX(E) can be expressed by $$\Delta V = \Delta Vcs \times Cs/Ctot$$

$$Ctot = Clc + Cs + Cps + Cgs$$

where a total capacitance Ctot is the sum of a liquid crystal capacitance (Clc) generated in the liquid crystal layer LQ by the voltage applied to the pixel electrode EP and counter-electrode ET, the auxiliary capacitance (Cs), the coupling capacitance (Cps) between the pixel electrode EP and signal line X, and a coupling capacitance (Cgs) between the pixel electrode EP and scanning line Y.

That is, when the coupling capacitance Cps of the pixel PX(E) becomes greater than that of other pixels PX, the total capacitance Ctot increases, and the potential change $\Delta V$ decreases. Consequently, the end portion of the active area DSP is seen as a dark line in a normally black liquid crystal display apparatus, and as a bright line in a normally white liquid crystal display apparatus.

In this embodiment, therefore, the auxiliary capacitance Cs of the pixel PX(E) is greater than that of other pixels PX.

As shown in FIG. 3, the auxiliary capacitance line CsL extends in the column direction R, and the extension extends toward the light-shielding area SLD. In addition, the semiconductor layer 12 extends in a direction C from the formation position of the switching element W to the formation position of the auxiliary capacitance line CsL, and opposes the auxiliary capacitance line CsL. The area by which the auxiliary capacitance line CsL opposes the semiconductor layer 12 in the pixel PX(E) is larger than the area by which the auxiliary capacitance line CsL opposes the semiconductor layer 12 in other pixels PX. Referring to FIG. 3, the area by which the auxiliary capacitance line CsL opposes the semiconductor layer 12 is larger than that of other pixels PX by the amount of a hatched region. That is, the auxiliary capacitance Cs of the pixel PX(E) is greater than that of other pixels PX.

The area by which the auxiliary capacitance line CsL opposes the semiconductor layer 12 is desirably designed such that the change $\Delta V$ in pixel potential Vpix of the pixel PX(E) is equal to the change $\Delta V$ in pixel potential Vpix of other pixels PX. That is, the area by which the auxiliary capacitance line CsL opposes the semiconductor layer 12 is designed so that the ratio (=Cs/Ctot) of the auxiliary capacitance Cs to the total capacitance of the pixel PX(E) is equal to that of other pixels PX.

Accordingly, this embodiment can suppress the influence of the defective alignment region DM on the active area DSP, and make the change ΔV in pixel potential Vpix of the pixel PX(E) equal to that of other pixels PX, thereby providing a liquid crystal display apparatus having high display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active matrix type liquid crystal display apparatus having an active area including a matrix of pixels, and a light-shielding area surrounding the active area, comprising:
   a first substrate including a pixel electrode formed for each pixel, a switch including a portion of a semiconductor layer and configured to switch write of a video signal to the pixel electrode, and an auxiliary capacitance line opposing the semiconductor layer to form an auxiliary capacitance;
   a second substrate including a counter-electrode extending from the active area to at least a portion of the light-shielding area; and
   a liquid crystal layer held between the first substrate and the second substrate,
   wherein
   each of the pixel electrodes of end portion pixels formed in end portions of the active area extends from the active area to the light-shielding area such that the pixel electrode becomes larger than each of other pixel electrodes of other pixels formed inside the end portions within the active area;
   the auxiliary capacitance formed in each of the end portion pixels is greater than the auxiliary capacitance formed in each of the other pixels; and
   wherein a ratio of the auxiliary capacitance to a total capacitance in each of end portion pixels is equal to a ratio of the auxiliary capacitance to a total capacitance in each of other pixels.

2. The apparatus according to claim 1, wherein the first substrate further comprises a light-shielding conductive layer formed in the light-shielding area.

3. An active matrix type liquid crystal display apparatus having an active area including a matrix of pixels, and a light-shielding area surrounding the active area, comprising:
   a first substrate including a pixel electrode formed for each pixel, a switch including a portion of a semiconductor layer and configured to switch write of a video signal to the pixel electrode, and an auxiliary capacitance line opposing the semiconductor layer to form an auxiliary capacitance;
   a second substrate including a counter-electrode extending from the active area to at least a portion of the light-shielding area; and
   a liquid crystal layer held between the first substrate and the second substrate,
   wherein
   the pixel electrode of an end portion pixel formed in an end portion of the active area extends from the active area to the light-shielding area such that the pixel electrode becomes larger than another pixel electrode of another pixel formed inside the end portions within the active area,
   an area by which the semiconductor layer of the end portion pixel opposes the auxiliary capacitance line is larger than an area by which the semiconductor layer of another pixel opposes the auxiliary capacitance line;
   the auxiliary capacitance formed in the end portion pixel is greater than the auxiliary capacitance formed in said another pixel; and
   wherein a ratio of the auxiliary capacitance to a total capacitance in the end portion pixel is equal to a ratio of the auxiliary capacitance to a total capacitance in said another pixel.

4. The apparatus according to claim 3, wherein the first substrate further comprises a light-shielding conductive layer formed in the light-shielding area.

5. The apparatus according to claim 3, wherein a change in pixel potential of the end portion pixel is equal to a change in pixel potential of said another pixel.

6. The apparatus according to claim 4, wherein a change in pixel potential of the end portion pixel is equal to a change in pixel potential of said another pixel.

7. An active matrix type liquid crystal display apparatus having an active area including a matrix of pixels, and a light-shielding area surrounding the active area, comprising:
   a first substrate including a pixel electrode formed for each pixel, a switch configured to switch write of a video signal to the pixel electrode, and an auxiliary capacitance line forming an auxiliary capacitance in each pixel;
   a second substrate including a counter-electrode extending from the active area to at least a portion of the light-shielding area; and
   a liquid crystal layer held between the first substrate and the second substrate,
   wherein
   each of the pixel electrodes of end portion pixels formed in two end portions of the active area extends from the active area to the light-shielding area such that the pixel electrode becomes larger than each of other pixel electrodes of other pixels formed inside the end portions within the active area;
   the auxiliary capacitance formed in each of the end portion pixels is larger than the auxiliary capacitance formed in each of the other pixels; and
   wherein a ratio of the auxiliary capacitance to a total capacitance in each of end portion pixels is equal to a ratio of the auxiliary capacitance to a total capacitance in each of the other pixels.

8. The apparatus according to claim 7, wherein the first substrate further comprises a light-shielding conductive layer formed in the light-shielding area.

* * * * *